United States Patent
Jung et al.

(10) Patent No.: US 6,451,273 B2
(45) Date of Patent: Sep. 17, 2002

(54) METHOD OF PRODUCING AN ACTIVE MINERAL LIQUID FROM GRANITE

(76) Inventors: Dae-Kyu Jung, 681-1 Naeson-dong, Euiwang-shi, Kyunggi-do 490-121 (KR); Kyu-Heon Lee, Ssangyoung Apt.,Bldg.#506-202, Tapmaul, 530 Yatap-dong, Pundang-ku, Seongnam-shi, Kyunggi-do 463-070 (KR)

( * ) Notice: Subject to any disclaimer, the term of this patent is extended or adjusted under 35 U.S.C. 154(b) by 81 days.

(21) Appl. No.: 09/737,395

(22) Filed: Dec. 15, 2000

(30) Foreign Application Priority Data

Jun. 13, 2000 (KR) ............................................ 00-32367

(51) Int. Cl.[7] ................................................. C22B 3/00
(52) U.S. Cl. ........................ 423/1; 423/132; 423/150.1
(58) Field of Search ........................ 423/1, 132, 150.1, 423/155, 201, 69

(56) References Cited

U.S. PATENT DOCUMENTS 1,233,273 A * 7/1917 Jackson et al. ................ 423/1
1,378,485 A * 5/1921 Rankin ........................... 423/1
1,471,751 A * 10/1923 Rankin et al. ................. 423/1

* cited by examiner

*Primary Examiner*—Steven Bos
(74) *Attorney, Agent, or Firm*—ZITO tlp; Joseph J. Zito; Kendal M. Sheets

(57) ABSTRACT

A method of extracting active mineral liquid from a rock such as granite is described. This method comprises charging an extraction vessel with finely divided granite at ambient temperature and pressure; introducing an aqueous ammonia solution with agitating and then diluted sulfuric acid into the vessel; introducing 98% ethyl alcohol at below 80° C. into the vessel to elevate the inner pressure of the vessel to 2–3 kg/cm$^2$ for facilitating the formation of complexes; and agitating the resulting reaction mixture for 20–160 minutes at 80° C. to 85° C. while maintaining the internal pressure of the vessel. The active mineral liquid is advantageously used as a mineral source for soils, animals, plants, the human body and so forth, and as an agent for the purification of waterworks as well as for the treatment of wastewater.

6 Claims, 1 Drawing Sheet

METHOD OF PRODUCING AN ACTIVE MINERAL LIQUID FROM GRANITE

BACKGROUND OF THE INVENTION

1. Field of the Invention

Figure 1:
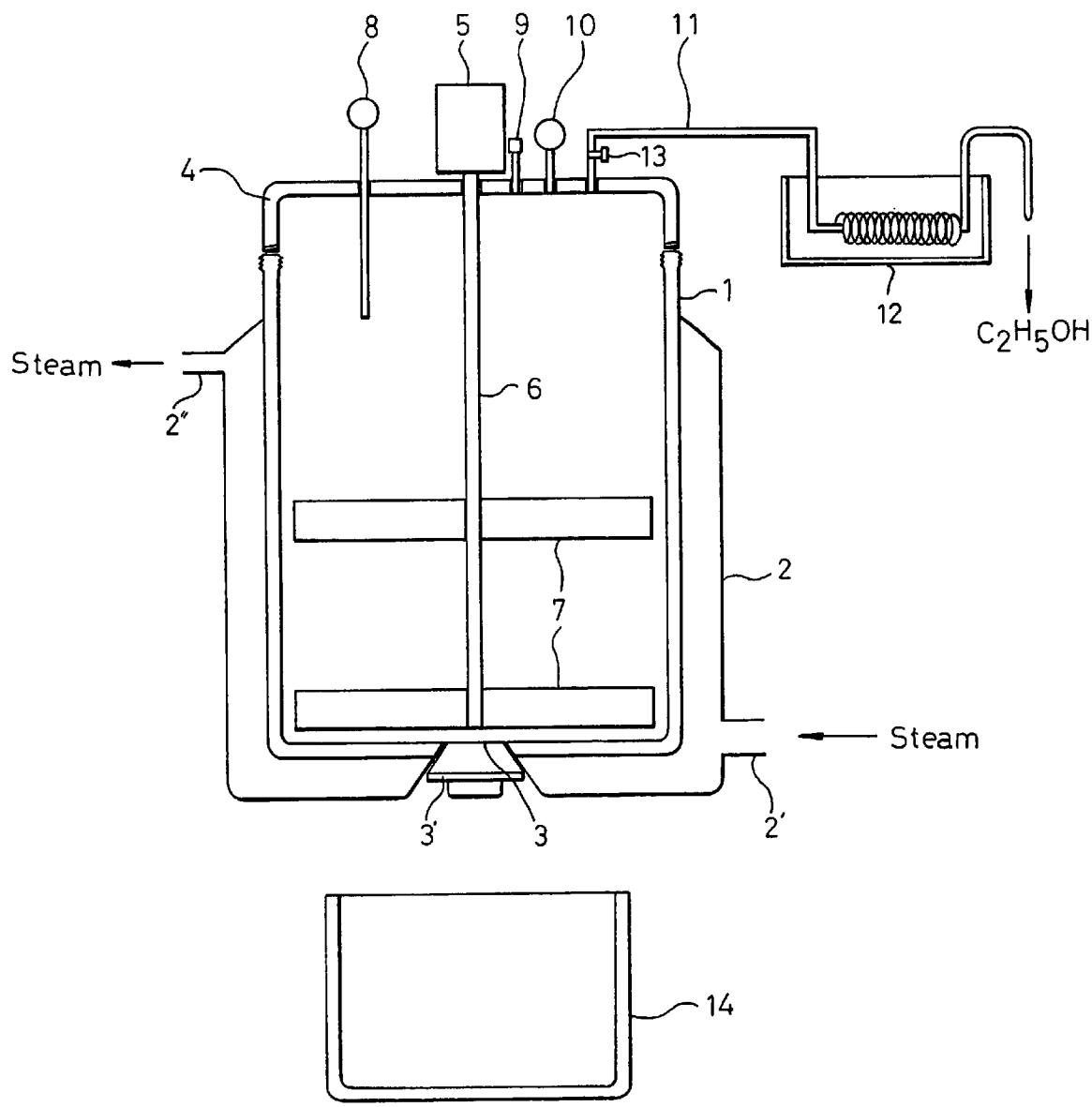

The present invention relates to a method of producing an aqueous solution of the active inorganic materials extracted from rocks, particularly, granite.

Although commercially available inorganic materials usually called "minerals" have hitherto been produced individually or in the form of a mixture, a technique by which active inorganic materials can be extracted directly from rocks in aqueous solution has not yet been known in the art.

2. Disclosure of the Prior Art

Nowadays, according to the development of industries, natural resources become gradually consumed and drained, resulting in the extreme desolation of the natural environment. Thus, human beings are suffering from and faced with severe natural difficulties and disasters such as a sharp decrease of agricultural harvests, a shortage of drinking water, and so forth. Several studies and efforts have been somewhat helpful to diminish or surmount such difficulties and disasters. However, there still remain many resources to be exploited for improving the life of human beings. For example, many rocks such as granite are being used as aggregate or raw materials for public works and construction. These rocks have been disregarded with respect to their significance. Certain secondary resources useful for the life of human beings can be obtained from them. As is well known, many kinds of inorganic metal components are abundantly contained in the rocks.

SUMMARY OF THE INVENTION

The object of the invention is to provide a method of treating stone or rocks, particularly, granite, which are scattered throughout the country, to extract inorganic metal components from the rocks.

Another object of the invention is to obtain inorganic metal components useful as mineral sources to be supplied to soils, animals, plants or the human body and useful in industrial facilities such as water or wastewater-purifying or treating facilities.

The above objects can be achieved by the method according to the present invention, which comprises charging an extracting vessel with finely divided granite at ambient temperature and pressure; introducing an aqueous ammonia solution with agitating and then diluted sulfuric acid into the vessel; introducing 98% ethyl alcohol ($C_2H_5OH$) into the vessel at below 80° C. so as to elevate the internal pressure of the vessel to 2 to 3 kg/cm² for facilitating the formation of complexes; and then agitating the resultant reaction mixture for 20–160 minutes at 80° to 85° C. while maintaining the inner pressure of the vessel.

A chemical analysis of a raw rock, granite, which is widely available in Korea, is shown in Table 1 below.

TABLE 1

Analysis of Granite (% by weight)*

| | | | | | | |
|---|---|---|---|---|---|---|
| $Li_2O$ | 0.01 | $Na_2O$ | 1.92 | MgO | 12.5 | $Al_2O_3$ | 9.46 |
| $SiO_2$ | 49.4 | $P_2O_5$ | 0.40 | $K_2O$ | 2.05 | CaO | 10.4 |
| $TiO_2$ | 1.30 | $MnO_2$ | 0.17 | NiO | 0.09 | $Fe_2O_3$ | 8.09 |
| CuO | 0.03 | $V_2O_5$ | 0.01 | $ZnO_2$ | 0.02 | SrO | 0.04 |
| $ZrO_2$ | 0.01 | $La_2O_3$ | 0.01 | $Co_2O_3$ | 0.01 | $Nd_2O_5$ | 0.03 |

(*According to a wet instrumental analysis; Korea Institute of Ceramic Engineering and Technology)

For the sake of convenience in handling, the finely divided granite preferably has an average particle size of about 80 to 100 mesh. As generally well known, the solubility of ammonia gas (NH57) in water is about 33.1% (by weight) at ambient temperature (20° C.). Generally, about 30% aqueous ammonia solution is commercially available. Therefore, this solution may be used in performing the present invention as it is. However, the ammonia solution, the solubility of which is diluted to 15 to 20%, may also be used in consideration of its cost or reactivity. Sulfuric acid is available in various concentrations ranging from 78% to 100%, but about 23% to 30% sulfuric acid giving a higher activity is preferably used in the present invention in view of its costs.

Generally, ammonia has an ability to form a coordinate covalent bond or an ion-dipole bond with the molecules or ions capable of accepting electron pairs; thus it can create numerous complexes by so-called "ammonization." The aqueous ammonia solution (ammonia water or aqua ammonia) contains the molecular species, $NH_3$ and $NH_4OH$ (ammonium hydroxide), $NH_4^+$, $OH^-$, etc. In the present invention, the ammonia water is employed to pre-treat the raw material so that inorganic metal ions can form complex ions with $NH_3$, $H_2O$, $OH^-$ or the like, which are the ligands of the complex salts isolated from the granite. On contacting the inorganic metal ions, the ammonia water dissociates and reacts with the metal ions as shown in Equations 1 and 2 below.

Equation 1:

$$2NH_4OH \rightarrow NH_4^+ + H_2O + 2OH^- + H^+$$

Equation 2:

$$4MO + 4NH_4OH \rightarrow 2M(OH)_2 + M_2(NH_4)_4(OH)_4,$$

wherein M is a bivalent metal ion. For example, a reaction of the ammonia water with aluminum oxide can be shown as follows:

$$Al_2O_3+NH_4OH \rightarrow Al(OH)_3+Al(OH)_x(NH_3)_y+H_3O^++OH^-,$$

wherein x+y=4, 6 or 8.

Treatment of the rock with ammonia water is desired for preventing the inorganic metal ions from being linked with strong field ligands such as Co (II or III), $CN^-$, $NO_2^-$ and the like, which may be present in the raw rock. Since the inorganic metal complexes formed by the reaction with such strong field ligands are very stable and have low reactivity, they are undesirable for the purpose of the present invention. Therefore, according to the invention, the raw material is treated so that the inorganic metal ions can be captured in the form of complexes with the low field ligands such as $H_2O$, $NH_3$, $SO_4^=$ and so forth, as described hereinbelow. It is believed that the addition of sulfuric acid permits the inorganic metal ions to produce various types of complexes other than the usual sulfates in the form of normal, acidic and basic salts. In view of the coordinate covalent bond theory, such complexes may be shown as follows; however, the types of complexes are not critical in the present invention:

$$Ma_m[Mb_n(SO_3)_x(SO_4)_y]_z$$

$$Ma_m[(SO_3)_x(SO_4)_y]_z$$

$$[Ma_m(SO_3)_x](SO_4)_y Mb_n(SO_4)_y$$

$$Ma_m[Mb_n(NH_3)_x(SO_4)]_z$$

$Ma_m[(NH_3)_x(SO_4)]_z$ $Ma_m[Mb_n(H_2O)_x(SO_4)_y]_z$ $Ma_m[(SO_3)_x(NH_3)_y]SO_4$

Wherein:
Ma is an inorganic metal (complex) ion;
m is the number of the inorganic metal ions;
Mb is another inorganic metal ion;
n is the number of inorganic metal ions;
x, y are each the number of ligands or complex ions; and
z is the number of free ions
Important complexes are exemplified as follows:

$Al_2[Fe(SO_3)_4(SO_4)_2]_2$ $Fe_2[(SO_3)_4(SO_4)_2]_2$ $Al_2[(SO_3)_4(SO_4)]_3$ $Al_2(SO_4)_3$ $Al_2[Fe(NH_3)_4(SO_4)_2]_2$ $Fe_2[(NH_3)_4(SO_4)_2]_2$ $Mg[Fe(H_2O)_4(SO_4)_2]_2$ $Fe[(SO_4)_2(NH_3)_4]SO_4$

The way of reading a complex is schematically illustrated below:

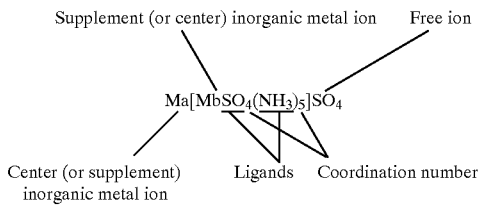

Quantitative and qualitative analyses for respective inorganic metal cations, free radical anions, and ligands may be performed according to a general chemical quantitative and qualitative analytical method. Particularly, in the case of a metal cation, it can easily be detected by an atomic absorption spectrometry, inductively coupled plasma spectrophotometry (ICP) and so forth. Anions such a sulfate ion can also be easily detected by an ion chromatography.

When the reaction is completed, ethyl alcohol is recovered through a condenser for recycle. When the internal pressure in the extraction vessel drops to ambient pressure, the resulting crude liquid product is transferred into an acid-resistant tank through a discharging port with continuously operating an agitator. This crude product is then passed through a filter press to perform a solid-liquid separation, resulting in the formation of the desired clean mineral liquid in which inorganic metal ions are present in solution. The concentration of the total salts present in the mineral solution so obtained may simply be determined by comparing it with the concentration of a reference solution according to a conventional method using a refractometer. Upon being determined by this method, the concentration of the total salts in the mineral solution of the present invention has been found to be about 30 to 40% by weight on average.

The sludge which is formed as a by-product from the solid-liquid separation can also advantageously be utilized without disposal. The sludge contains plenty of mica, silicates, silica, and so forth which can also be easily recovered. The recovered mica is baked so that it can be used as a heat-insulating material, radioactivity absorbent, feed stuff additive, soil modifier, and so forth. The silicates so recovered, after being purified, are useful as additives for paints, or materials for silicone rubbers, silicon oils, and the like. The silica is useful as a building material or interior finishing material. Further, the residues themselves from the solid-liquid separation can be used as a mineral fertilizer, soil modifier, and the like. Therefore, the method according to the present invention may be called a clean technique which is free from environment contamination.

DETAILED DESCRIPTION OF THE PREFERRED EMBODIMENTS

Preferred embodiments of the present invention will be described and illustrated in greater detail in the following non-limiting examples, with reference to the accompanying FIGURE, which shows diagrammatically an extraction vessel which is used for extracting inorganic metal ions from a rock according to the method of the invention.

EXAMPLES

Referring to FIG. 1, an extraction vessel is denoted as reference number 1. The external surface of the vessel 1 is surrounded by a heating jacket 2. The vessel 1 is thus designed so as to be heated by the steam introduced through a steam inlet 2'. The steam is cycled through a steam outlet 2". The vessel 1 has a discharging port 3 at its bottom, and the port is plugged with a plug 3' during the extraction operation. The vessel 1 is provided with an openable/closable cover 4 at the upper end thereof. A motor 5 is mounted at the center on the cover 4 and is, through the cover 4, connected to a driving axis 6 in the vessel 1. The driving axis 6 is provided with the proper number of agitating blades 7 at the downward position thereof. The cover 4 is also provided with a thermometer 8, a pressure control valve 9, a pressure gauge 10, and an ethyl alcohol recovering conduit 11. This conduit 11 is connected to a condenser 12 and provided with an ethyl alcohol recovering valve 13 at it inlet portion, that is, in the vicinity of the vessel 1. Further, adjacent to the discharging port 3, an acid-resistant tank 14 is arranged as a receptacle for temporarily storing the product from the vessel before transferring the product into a filter (not shown). Thus, no further explanation on the acid-resistant tank will be made herein.

Example 1: Extraction of Granite

A raw rock, granite, which was taken at Kwangchun, Chungnam Province, Korea (See, Table 1 above for its analytical data) was crushed in a proper crusher to obtain finely divided powder having an average size of 98 mesh. There was charged 100 kg of this powder into the extraction vessel 1 shown in FIG. 1 above. After pouring 20 kg of 20% $NH_4OH$ into the vessel, the vessel was closed with the cover 4 and the motor 5 was operated at 40–50 rpm at ambient temperature for 15 minutes to agitate the mixture. Subsequently, the cover 4 was opened and 120 kg of 25% aqueous sulfuric acid solution was poured into the vessel. The temperature of the heating jacket 2 was adjusted to a temperature below 80° C., and 60 kg of ethyl alcohol (98%) was added. Thereafter, the cover 4 was tightly closed. The motor 5 was operated at 40–50 rpm again with elevating the temperature of the heating jacket 2 to 85° C. At this time, the pressure gauge 10 was adjusted so as to maintain the internal pressure at 2 km/cm$^2$, and the mixture was continuously agitated for 160 minutes. After the reaction was completed, ethyl alcohol was passed through the condenser 12 by opening the valve 13 and then recovered. (The recovered ethyl alcohol can be used for the next cycle of extraction.)

Thereafter, when the internal pressure dropped to ambient pressure, the plug 3' at the discharging port 3 was opened so as to transfer the resulting liquid into the tank 14. The liquid was passed through a filter press, not shown. The concentration of the total salts (inorganic salts) in the liquid was found to be 40% on average. This liquid was diluted with distilled water to obtain an about 23–25% solution which was then poured into a polypropylene (PP) bottle. This bottle was sealed to be launched as a finished product. Data for the quantitative analysis of this product are listed in Table 2 below.

TABLE 2

| Component | Content (ppm) | Component | Content (ppm) |
|---|---|---|---|
| Li | 3 | Na | 59 |
| Mg | 12232 | Al | 7369 |
| Si | 9 | P | 125 |
| K | 3113 | Ca | 294 |
| Ti | 1829 | V | 17 |
| Mn | 61 | Fe | 10384 |
| Co | 10 | Ni | 95 |
| Cu | 52 | Zn | 12 |
| Sr | 1 | Zr | 0.4 |
| Ba | 0.7 | Nd | 0.8 |

(According to the ICP; Korea Testing and Research Institute for Chemical Industry)

Example 2: Application of the Product of the Invention (Treatment of Wastewater from a Leather Processing Plant)

1. According to a conventional activated sludge method, wastewater from a leather processing plant located at the Seoul metropolitan area was treated in the following manner:

(1a) To 0.5 ton of wastewater (raw water) collected from the leather processing plant, 150–200 ppm of 30% sulfuric acid was to bring the liquid to pH 4–5. Then, the water was transferred into a reaction tank (extracting vessel).

(1b) To the reaction tank, there were added 500 ppm of ferric sulfate and 200 ppm of a polymer coagulator (available from Seil Industries, Ltd., Korea, under a trade name A101), together with 150–200 ppm of slaked lime, to neutralize the mixture to about pH 7–8.

(1c) The water so treated was transferred into a preliminary precipitation tank to effectuate solid-liquid separation while transferring the resultant coagulates into a concentration tank. Then, the water preliminarily treated in this manner was moved to four activated sludge tanks in a second treatment tank to subject it to aeration in a conventional manner ("activated sludge treatment").

(1d) The water so treated was transferred into a secondary precipitation tank and subjected to solid-liquid separation while sending the resultant coagulates to a concentration tank. The water obtained at this stage was aerated in a third treatment tank by adding 100 ppm of H$_2$O$_2$. 150 ppm of ferrous chloride (FeCl$_2$) and 50 ppm of an anion polymer coagulator (available from Hansu, Ltd., Korea, under a trade name of Kuniflock PN) thereto. The resulting water was sent to a third precipitation tank for a solid-liquid separation. The supernant was discharged according to the discharging regulation (COD=BOD=90 ppm).

(1e) The sludge so collected in the concentration tank was concentrated and subjected to moisture removal by means of a dehydrator. The hydrated sludge was treated in a sludge incinerator, and the filtrate was recycled to the preliminary treatment tank.

It takes about 24–25 hours to continuously carry out the steps (1a) to (1e) above.

2. The wastewater (raw water) collected from the same leather processing plant was treated with the active mineral liquid prepared by the method of the invention, according to the following process:

(2a) To 0.5 ton of the wastewater in a reaction tank, 150–200 ppm of sulfuric acid (30%) was added to bring the wastewater to pH 4–5.

(2b) To the reaction tank, 200 ppm of ferric sulfate and 800–1000 ppm of the active mineral liquid were added. This mixture was adjusted to pH 7–8 with slake lime and 50 ppm of a precipitant [available from Hansu, Ltd., Korea, under a trade name Polymer Multipol AG] was added thereto. This water preliminarily treated was transferred to a precipitation tank to effectuate solid-liquid separation. The resultant coagulates were sent to a concentration tank.

(2c) The filtrate obtained in the above step was transferred to a reaction tank, and 800–1000 ppm of the activated mineral liquid was added thereto. The mixture was adjusted to pH 7–8 with slake lime and 50 ppm of a precipitant was then added thereto. The resultant mixture was sent to the precipitation tank to perform solid-liquid separation.

(2d) The water treated above was allowed to pass through a sand filter so that it can be discharged according to the discharging regulation (COD=BOD=90 ppm).

(2e) The coagulates so collected in the concentration tank were concentrated and the filtrate was recycled to the secondary treatment tank. The sludge was dehydrated in a hydrator and discarded. The filtrate was recycled to the preliminary treatment tank.

It takes about 3–4 hours to continuously carry out the steps (2a) to (2e) above.

An analysis of the water treated by each of the processes (1) and (2) showed the results as listed in Table 3 below.

TABLE 3

| | Raw water | Conventional method | Removal rate | The invention | Removal rate |
|---|---|---|---|---|---|
| PH | 9–10 | 6.2 | — | 6.8 | — |
| COD | 1200 | 90 | 92.2 | 50 | 95.8 |
| BOD | 900 | 80 | 91.1 | 40 | 95.5 |

(Note: COD and BOD are in ppm.)

From the above data, it has been found that the process wherein the active mineral liquid of the invention can treat wastewater in a small scale but in a simple and inexpensive manner for a short period of time, resulting in a higher degree of water purification, as compared with the conventional activated sludge methods. That is, this is because apart from the chemical or biological wastewater treatment processes in the prior art wherein the inorganic coagulants containing Al or Fe ion, such as aluminum sulfate, ferric sulfate, and so forth, and the polymer coagulants are employed, the process wherein the active mineral liquid of the invention is used can efficiently decompose and then coagulate the organic components such as proteins, oils and the like contained in the wastewater.

The present invention has been described with respect to the advantages only when the active mineral liquid prepared according to the method of the invention is applied to the treatment of wastewater. However, it is expected that the mineral liquid can also be advantageously utilized in other fields of industries, including agricultural, pharmaceutical, and food industries, which require a supply source of minerals.

Further, although only granite is exemplified as a raw rock for carrying out the invention herein, it would be obvious to those skilled in the art that the method of the invention can be appropriately modified and applied to the extraction of various minerals from other rocks such as talc.

Thus, the invention provides a novel method capable of simply extracting various minerals useful for human life from rocks without environmental pollution, which can optimize the prevention and utilization of natural resources.

What is claimed is:

1. A method of extracting an active mineral liquid from granite, comprising:

charging an extracting vessel with finely divided granite at ambient temperature and pressure;

introducing an aqueous ammonia solution with agitating and then diluted sulfuric acid into the vessel;

introducing 98% ethyl alcohol into the vessel at 80° C. so as to elevate the internal pressure of the vessel to 2–3 kg/cm$^2$ for facilitating the formation of complexes; and agitating the resultant reaction mixture for 20–160 minutes at 80° to 85° C. while maintaining the inner pressure of the vessel.

2. The method according to claim 1, wherein the finely divided granite has an average particle size of from 80 to 100 mesh.

3. The method according to claim 1, wherein the aqueous ammonia solution is about 30% in concentration.

4. The method according to claim 1, wherein the aqueous ammonia solution is about 15 to 20% in concentration.

5. The method according to claim 1, wherein the sulfuric acid is 25 to 30% in concentration.

6. The method according to claim 1, wherein the ethyl alcohol is recovered and reused.

* * * * *